United States Patent [19]
Okuda et al.

[11] Patent Number: 5,896,362
[45] Date of Patent: Apr. 20, 1999

[54] LENS INCLINATION ADJUSTMENT SYSTEM

[75] Inventors: Isao Okuda, Tokyo; Toshiyuki Kase, Kanagawa-ken; Hiroshi Nishikawa, Tokyo, all of Japan

[73] Assignee: Asahi Kogaku Kogyo Kabushiki Kaisha, Tokyo, Japan

[21] Appl. No.: 08/899,701

[22] Filed: Jul. 24, 1997

[30] Foreign Application Priority Data

Jul. 26, 1996 [JP] Japan ................................. 8-197315

[51] Int. Cl.$^6$ ........................................................ G11B 7/09
[52] U.S. Cl. ..................... 369/112; 369/44.23; 369/53; 356/359
[58] Field of Search ...................... 369/112, 44.23, 369/53, 46.24; 356/359, 353, 360

[56] References Cited

U.S. PATENT DOCUMENTS

| 5,317,144 | 5/1994 | Oono et al. | 369/44.23 |
| 5,379,105 | 1/1995 | Iki et al. | 356/359 |
| 5,432,606 | 7/1995 | Noguchi et al. | 356/360 |
| 5,532,987 | 7/1996 | Fujita et al. | 369/44.24 |
| 5,553,052 | 9/1996 | Oono et al. | 369/112 |

FOREIGN PATENT DOCUMENTS 7146142  6/1995  Japan.

OTHER PUBLICATIONS

"Superresolution Readout System with Electrical Equalization for Optical Disks" by Takaya Tanabe, *Applied Optics*, vol. 34, No. 29, Oct. 10, 1995.

"Aberration Limits for Annular Gaussian Beams for Optical Storage" by T.C. Strand and H. Werlich, *Applied Optics*, No. 16, Jun. 1, 1994.

*Primary Examiner*—Tod R. Swann
*Assistant Examiner*—Kim-Kwok Chu
*Attorney, Agent, or Firm*—Greenblum & Bernstein, P.L.C.

[57] ABSTRACT

A lens adjustment system including a interferometer and an adjustment unit is used for adjusting an inclination of a lens of an optical data recording/reproducing device. The interferometer detects an inclination angle of the objective lens, then, the inclination of the lens is adjusted at the adjustment portion. There are two light sources: one is for the interferometer; and the other is for monitoring the inclination adjustment. The inclination adjustment unit has an optical element which prevents the beam projected toward the interferometer from being incident on an image receiving surface of the monitoring system, and only the beam for monitoring the inclination adjustment is observed when the inclination of the lens is being adjusted.

13 Claims, 7 Drawing Sheets

LENS INCLINATION ADJUSTMENT SYSTEM

BACKGROUND OF THE INVENTION

The present invention relates to a lens inclination adjustment system, and more particularly, to a lens inclination adjustment apparatus having an inclination monitoring system which is used when changing the lens inclination.

Conventionally, a data recording/reproducing device using an optical disk as a recording medium has been known. Such a device is provided with an optical system which includes a light source and an objective lens held in a lens holder. A recording medium (i.e., an optical disk) is set at a focal point of the objective lens. The light source emits a parallel light beam which is focused by the objective lens to form a beam spot on the recording medium. The beam reflects off the recording medium and is received by an optical pick-up device.

In the data recording/reproducing device, an optical axis of the objective lens is preferably intersects the recording medium at a right angle because, if the optical axis inclines with respect to a normal line to the recording medium, coma occurs, which may cause the beam spot formed on the recording medium to be wider than it should be. If the beam spot is wider, a density at which recording to the recording medium will be lower. Further, if the beam spot is wider, a reproduced signal may include noise.

Recently, a numerical aperture NA of the optical system for such a device has become larger. In the device which has an optical system having relatively great numerical aperture NA, even a small inclination of the objective lens may greatly affect the size of the beam spot.

Accordingly, it is necessary to adjust the inclination of the object lens such that an inclination angle formed between the optical axis of the objective lens and a line normal to the recording medium is within a permissible range. The permissible range is, for example, a range within 3 minutes. In order to adjust the inclination of the objective lens, conventionally, a lens inclination adjustment system is used. The conventional inclination adjustment system includes an interferometer unit and a lens inclination adjustment unit.

Firstly, at least a part of the data recording/reproducing device including the optical system and the light source is coupled with the interferometer unit, and interference fringes are observed. A user may determine the inclination angle and inclination direction which is a direction of inclination on a plane parallel to the surface of the recording medium or the cover glass facing the objective lens, based on the observed interference fringes.

Next, the data recording/reproducing device is coupled with the lens inclination adjustment unit, and the lens is moved so that the inclination (i.e., the inclination angle and inclination direction) is adjusted to be in a permissible range in accordance with the inclination angle and the inclination direction determined by the user.

When the inclination of the objective lens is thus adjusted, the part of the data recording/reproducing device is coupled to the interferometer unit again and the interference fringes are again observed. The above process of observing the interference fringe patterns, determining the inclination angle and the inclination direction of the objective lens and changing the inclination of the objective lens is repeated until the inclination of the objective lens falls within the permissible range.

Accordingly, it takes a long time to adjust the inclination of the objective lens. Further, the inclination direction and the inclination angle may not be detected sufficiently precisely, if the observation of the interference fringes are carried out by sight. In such a case, it may be difficult to adjust the inclination of the object lens to fall within a permissible range with use of the conventional lens inclination adjusting system, even if the above-described process is repeated.

Furthermore, when the recording/reproducing device is coupled with the interferometer unit; a laser diode included in the recording/reproducing device is turned ON. After the laser beam emitted by the laser diode is stabilized, the interference fringes are observed. When the recording/reproducing device is coupled to the lens inclination adjustment unit, the laser diode of the recording/reproducing device should be turned OFF since another light source may be used for monitoring the inclining status of the objective lens. It is relatively troublesome to turn ON or OFF the laser diode every time the recording/reproducing device is coupled with the interferometer unit and the inclination adjustment unit. Further, the above described process is time consuming because observation of the interference fringes should be done after the laser diode is turned ON and the emitted beam is stabilized.

SUMMARY OF THE INVENTION

It is therefore an object of the present invention to provide an inclination adjustment system with which the inclination of the objective lens of the data recording/reproducing device can be quickly and precisely adjusted.

According to the invention, there is provided a lens inclination adjusting system for adjusting an inclination of a lens mounted on an optical head of a data recording/reproducing device, comprising: an interferometer which generates an image of interference fringes representative of an inclination of the lens with respect to a reference surface, and a first light source which emits a first light beam toward the interferometer. The optical head is located at a first position at which an optical axis of the lens coincides with an optical axis of the interferometer when the image of the interference fringes are formed with interferometer. The lens is located between the first light source and the interferometer. The optical head is movable along an optical axis of said first light beam. The lens inclination adjustment system also comprises an inclination adjusting unit including an inclination monitoring system and inclination system. The optical head is located at a second position where the optical head faces the inclination changing system when the inclination of the lens is adjusted. The inclination monitoring system includes a second light source which emits a second light beam; an optical system which directs second light beam towards said lens; an image receiving system having an image receiving surface; and an optical element which prevents the first beam from being incident on the image receiving surface when the optical head is located at the second position. The second beam is reflected by the lens to be incident on the image receiving surface. The optical element allows at least a part of the second beam reflected by the lens to pass therethrough.

With this inclination adjusting system, even if the first beam is incident on the optical head when the inclination of the lens is being changed by the inclination adjusting system, the beam emitted by the first beam is not incident on the image receiving surface and therefore monitoring of the inclination status of the lens can be done by observation with reference to the reflected second beam. Accordingly, it is not necessary to turn off the light source when the optical head is moved from the first position to the second position, to perform accurate monitoring.

Optionally, the first beam is a linearly polarized beams polarized in a first direction, wherein the second beam includes a component which is not polarized in the first direction, and wherein the optical element is a polarizing plate whose polarizing direction is rotated 90 degrees with respect to the first direction. With this configuration, the first beam can be cut off by the polarizing plate, allowing only the reflected beam to pass through the polarizing plate.

Further, the optical system includes a filter which reduces intensity of the second beam emitted by the second light source. Depending on the components included in the second beam, the intensity of the beam incident on the image receiving surface varies. By changing the filter, it becomes possible to adjust the intensity of the beam incident on the image receiving surface, which makes it easier to monitor the inclination since the reflected beam is projected on the image receiving surface at an appropriate brightness.

Optionally the first light source may be a Helium-Neon laser source. It should be noted that the He—Ne laser source is an example of the laser source and the type of the laser source is not limited to the He—Ne source.

Further, the second light source may be, but is not limited to, a laser diode. However, if the second light source is also used as a light source of the data recording/reproducing device, an appropriate light source should be chosen as the second light source.

Optionally, the inclination adjustment system may be provided with a guiding member for slidably guiding said optical head in the direction of the first beam at least between the first and second positions. Preferably, the guiding member is incorporated in the data recording/reproducing device, and the movable range includes the range where the optical head moves when tracks of an optical disk are traced.

Optionally the lens has a lens portion, and a flange portion surrounding the lens portion, and the second beam reflected by the flange portion is directed to the image receiving surface.

Preferably, a converging lens is provided between the lens and the image receiving surface, and the second beam is incident on substantially an entire area of the flange portion. In this case, the image of the reflected beam may be sufficiently small and identification of the inclination status may be made easier.

According to a further aspect of the invention, there is provided a lens inclination monitoring system for monitoring an inclination of a lens mounted on an optical head of a data recording/reproducing. The optical head is movable in a predetermined direction and comprises: a first light source which emits a first light beam towards one side of the lens; a second light source which emits a second light beam towards the other side of the lens; a light receiving system arranged on the other side of the lens; and an optical element arranged between the lens and the light receiving system. The first light has a predetermined characteristic. The light receiving system receives light incident from the lens. The optical element prevents a light beam having the predetermined characteristic from passing therethrough.

Since only the second light beam is incident on the light receiving system, even if the first beam is being emitted, the inclination of the lens can be monitored with reference to the second beam, and therefore the current inclination status can be monitored accurately.

Optionally, the second light beam has a component beam which has at least a characteristic different from the predetermined characteristic. Specifically, the predetermined characteristic includes a predetermined polarization direction. The optical element is a polarization filter which allows a beam having a polarization direction perpendicular to the predetermined polarization direction to pass therethrough.

DESCRIPTION OF THE ACCOMPANYING DRAWINGS

DESCRIPTION OF THE PREFERRED EMBODIMENT

An inclination monitoring system for a lens inclination adjustment system according to an embodiment of the invention is described with reference to the accompanying drawings.

Figure 1:
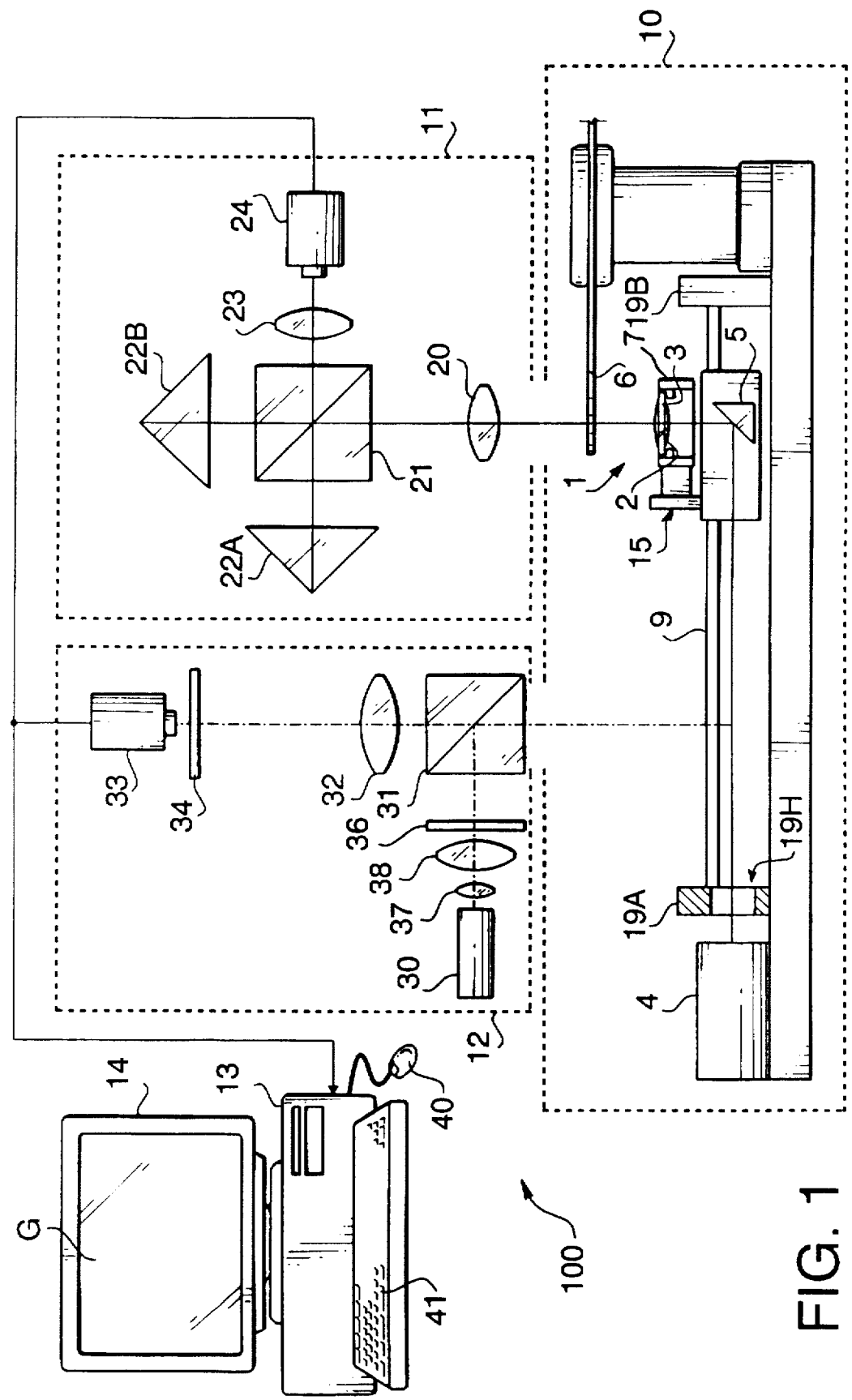
FIG. 1 is a diagram showing an arrangement of a lens adjusting system.

FIG. 1 is a diagram illustrating a schematic structure of an inclination adjustment system 100. The lens inclination adjustment system 100 includes a data recording/reproducing device 10 which uses an optical disk, an interferometer unit 11 to be coupled with the data recording/reproducing device 10, an inclination adjusting unit 12 which is also coupled to the data recording/reproducing device 10 and used for changing the inclination of an objective lens of the data recording/reproducing device 10, and a data processing device 13 such as a personal computer or the like. The data processing device 13 includes a display 14, a keyboard 41 and a mouse 40.

The data recording/reproducing device 10 is provided with an optical system which includes a light source 4, a pair of rail members 9, ends of which are supported by a pair of rail supports 19A and 19B. Further, an optical head 15 is slidably supported by the pair of rail members 9. The optical head 15 is movable within a movable range, which is a range between the pair of rail supports 19A and 19B, along the rail members 9, and includes an objective lens 1, a lens holder 7 on which the objective lens 1 is mounted, and a mirror 5.

The rail support 19A is formed with an opening 19H for allowing the light beam emitted by the light source 4 to pass therethrough. In this example the light source 4 is a laser diode and emits a laser beam which is linearly polarized in a direction parallel to a surface of the drawing. The laser beam emitted by the light source 4 passes through the opening 19H, and is reflected by the mirror 5 and directed to the objective lens 1.

When the inclination of the objective lens 1, with respect to the recording medium is determined, as described below, a cover glass 6 is placed in a position where a recording medium (e.g., an optical disk) would normally be placed in the data recording/reproducing device 10.

Figure 4A:
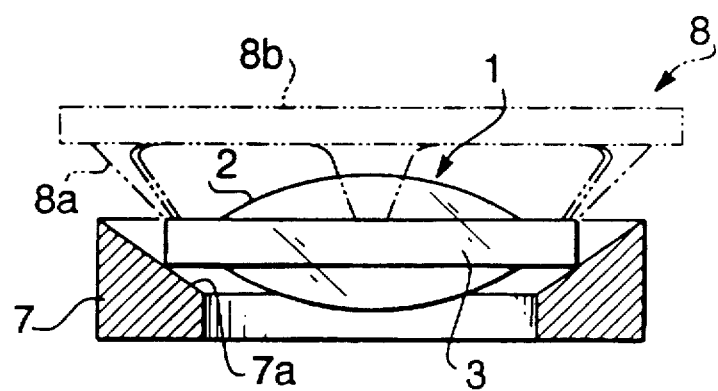
FIG. 4a is a side view of a objective lens, a lens holder and a jig used for adjusting the inclination of the lens.

As shown in FIG. 4a, the objective lens 1 includes a central lens portion 2, and a flat portion 3 (a flat flange portion) which encircles a circumference of the lens portion 2. An outer edge of the flat portion 3 is supported on a sloping surface 7a of the lens holder 7. After the inclination of the objective lens is adjusted, the objective lens is fixedly secured on the sloping surface with adhesive agent. In this embodiment, a UV (ultraviolet) hardening adhesive agent is utilized. The UV hardening adhesive agent initially has a certain viscosity, and when illuminated with a UV light, it hardens. In practice, first the lens is placed on the sloping surface 7a with the UV hardening adhesive agent applied, and the inclination is adjusted. After the inclination is adjusted, the UV light is projected towards the lens holder 7 so that the UV hardening adhesive agent is hardened and the object lens is fixedly secured.

Referring again to FIG. 1, the interferometer unit 11 includes a collimating lens 20, a beam splitter 21, corner-cube reflectors 22A and 22B, an imaging lens 23, and a CCD (charge coupled device) 24. The interferometer unit 11 is used for observing interference representing inclination of the objective lens 1 with respect to the cover glass 6. The inclination direction and the inclination angle θ are determined based on the observed interference fringes.

The inclination adjusting unit 12 is used to adjust the inclination of the objective lens. The inclination adjusting unit has an inclination monitoring system including; a light source (an He—Ne laser source) 30, a first lens 37, a second lens 38, a filter 36, a beam splitter 31, a collimating lens 32, a polarizing plate 34 and a CCD (charge coupled device) 33; and an inclination adjusting device (described later). The He—Ne laser source 30 emits a parallel laser beam.

A polarization direction of the polarizing plate 34 is rotated by 90 degrees with respect to the polarizing direction of the laser beam emitted by the light source 4, that is, the polarizing direction of the polarizing plate 34 is in a direction perpendicular to the sheet of FIG. 1. The laser beam emitted by the He-Ne laser source 30 is incident to the first lens 37 which has a shorter focal length, and then incident to the second lens 38 having a longer focal length. Note that the first and second lenses 37 and 38 constitute a relay optical system, and magnification of the relay optical system is greater than one. Further, the first and second lenses 37 and 38 are arranged such that the focal points of the first and second coincide. As a result, the diameter of the parallel beam emitted by the He—Ne laser source 30 is expanded by the lenses 37 and 38, and directed towards the beam splitter 31 as an expanded parallel beam, through the filter 36. The filter 36 is, for example, an ND (Neutral Density) filter used only for reducing intensity of incident light. By exchanging the filter 36, the intensity of the light beam directed to the beam splitter 31 can be changed. Note that the beam emitted by the He—Ne laser source 30 includes a component whose polarized direction is the same as the polarizing direction of the polarizing plate 34.

The data processing device 13 is connected with the CCD's 24 and 33. Image signals are transmitted from the CCD's 24 and 33 to the data processing device 13, respectively, and then displayed on a screen G of the display 14.

Adjustment of the inclination of the objective lens 2 with use of the lens inclination adjustment system 100 is now described in detail.

Figure 2:
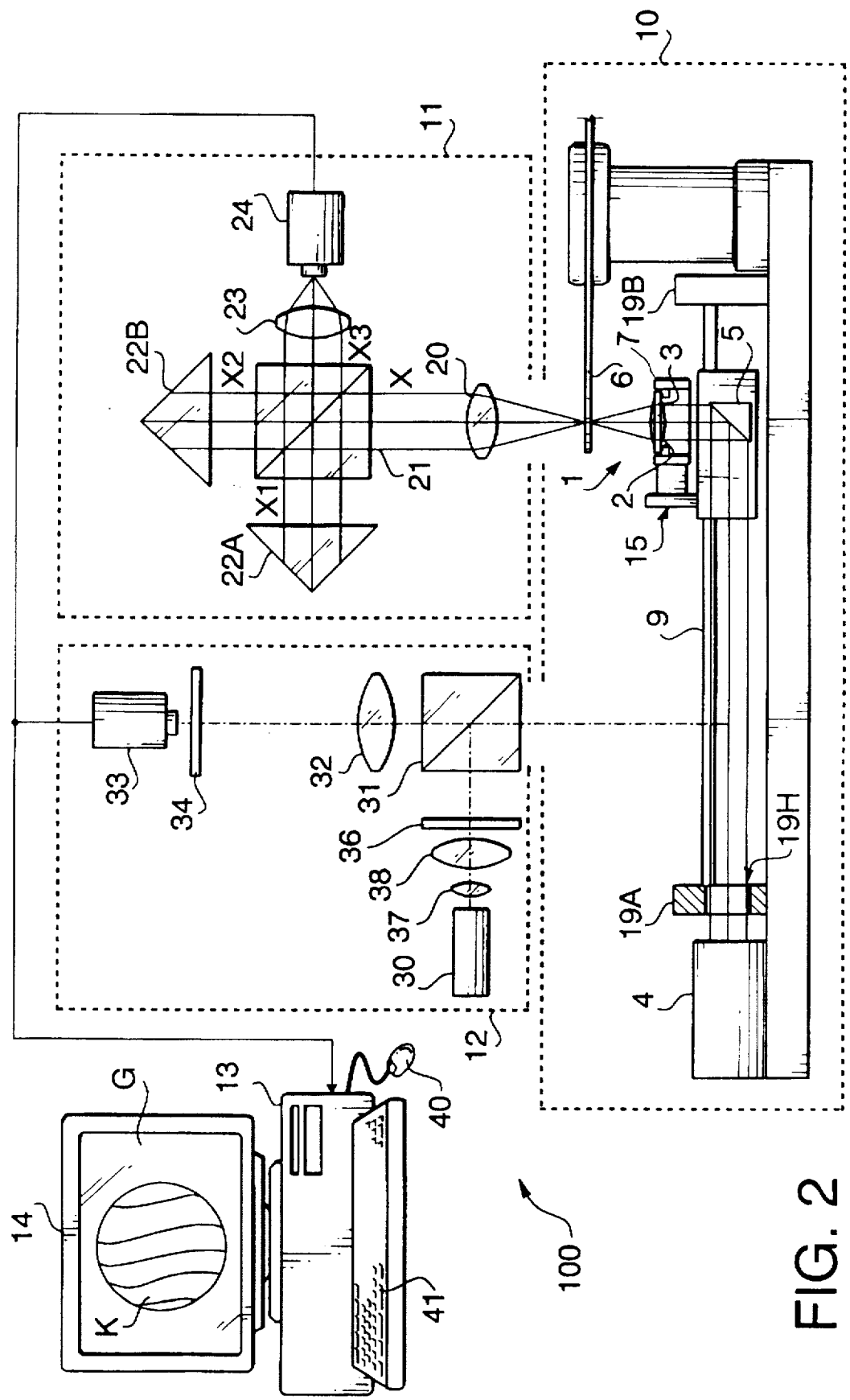
FIG. 2 is a diagram of a lens adjusting system wherein an interference fringes is observed.

The interferometer 11 is coupled to the data recording/reproducing device 10 with use of a coupling structure (not shown). Then, the optical head 15 is first located at a position where the object lens 1 faces the interferometer unit 11, as shown in FIG. 2. In accordance with the interference fringes formed by the interferometer unit 11, the inclination angle θ between the axis of the beam incident on the cover glass 6 and the line normal to the cover glass 6, and the inclination direction are determined.

Figure 3:
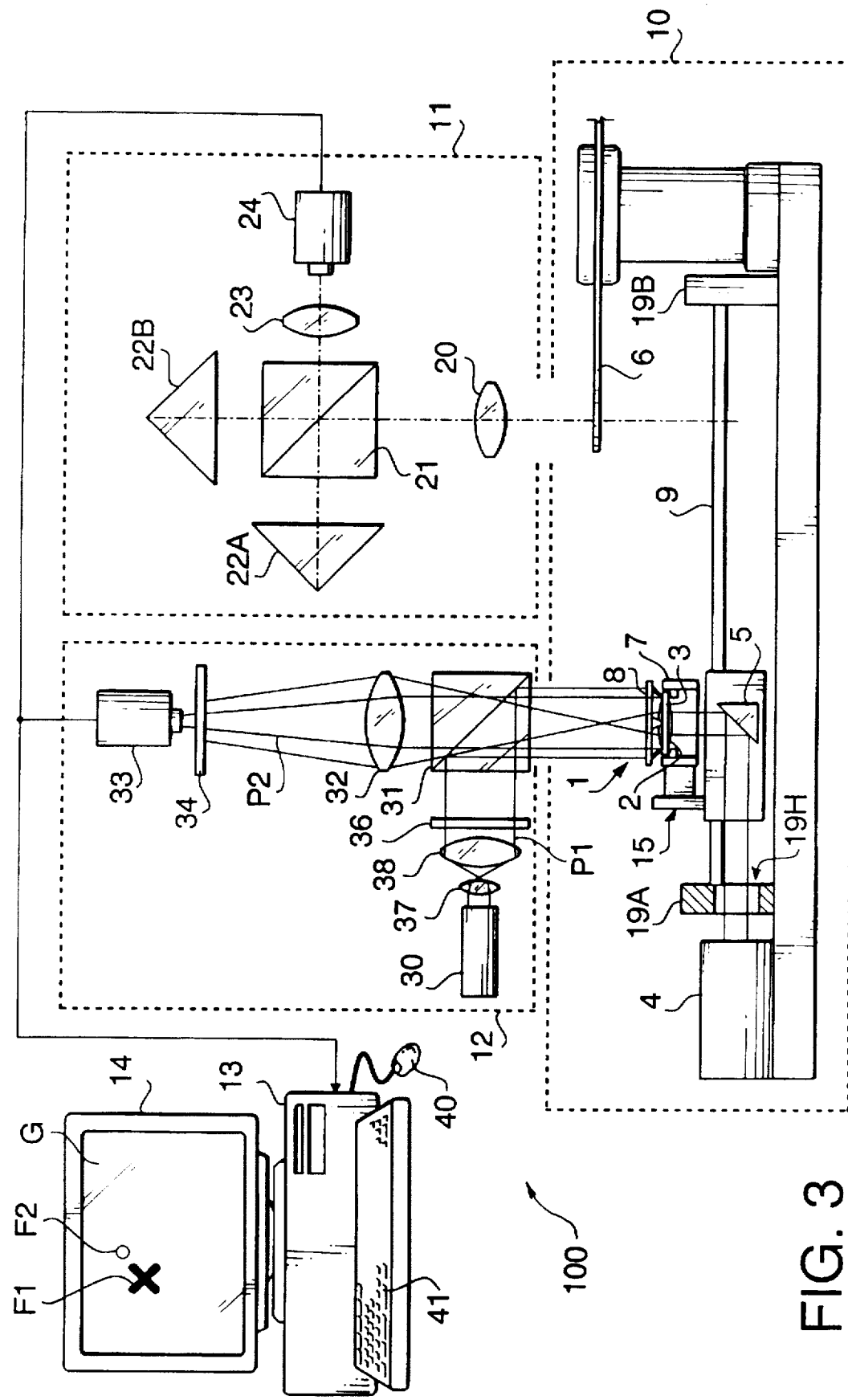
FIG. 3 is a diagram of a lens adjusting system wherein an inclination of an objective lens is adjusted.

If the inclination angle θ is greater than a predetermined threshold value (e.g., 3 minutes), the optical head 15 is then moved to the other side of its movable range so that the object lens 1 faces the inclination adjusting unit 12, as shown in FIG. 3. Note that the movable range of the optical head 15 corresponds to an area within which the optical head 15 would normally emit beams to the optical disk.

As described before, the laser beam emitted by the laser diode 4 passes through the opening 19H and is incident onto the mirror 5 regardless of the position of the optical head 15. Thus, the laser beam emitted by the laser diode 4 is reflected by the mirror 5, passes through the objective lens 1, converged by the collimating lens 32 and is incident to the polarizing plate 34. Since the polarizing direction of the beam incident to the polarizing plate 34 is rotated by 90 degrees with respect to the polarizing direction of the polarizing plate 34, the beam emitted by the laser diode 4 does not pass through the polarizing plate 34, and accordingly, the beam emitted by the laser diode 4 is not incident on the CCD 33. Since the beam emitted by the laser diode 4 does not affect the monitoring of the inclination status of the objective lens 1, it is unnecessary to turn off the laser diode 4 even when the inclination is adjusted and monitored.

The inclination of the objective lens 1 is then adjusted, based on the inclination angle θ and the inclination direction with use of the adjusting unit 12. This process is repeated until the inclination angle θ falls within a predetermined permissible range. When adjustment of the inclination of the objective lens is finished, the objective lens is secured in place.

Figure 6:
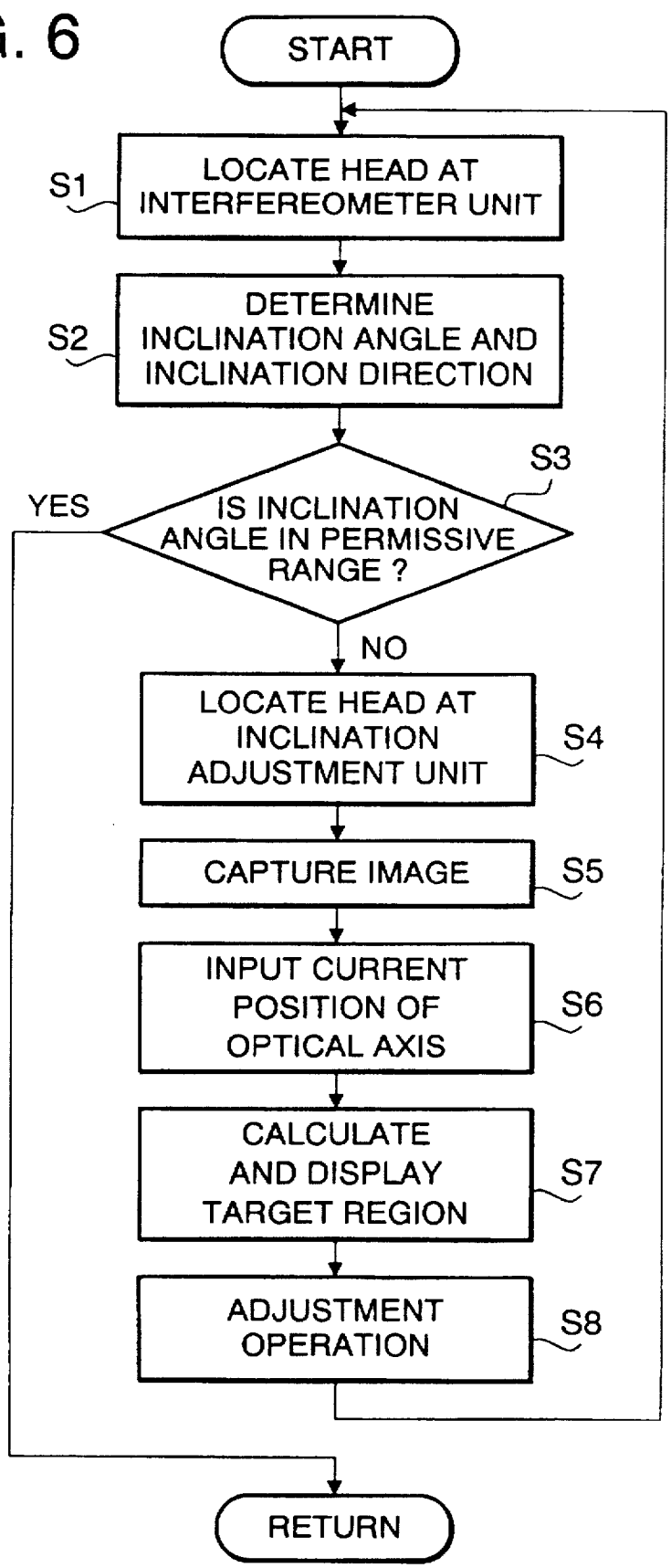
FIG. 6 is a flowchart illustrating a process of adjustment of the inclination of the objective lens.

A detailed process for determining the inclination angle θ and adjusting the inclination of the optical axis of the objective lens 1 is now described with reference to FIG. 6.

The objective lens 2 is mounted on the lens holder 7 with the UV hardening adhesive applied to the sloping surface 7a. Then, in step S1, the optical head 15 is located to face the interferometer unit 11, as shown in FIG. 2. A light beam emitted from the light source 4, is reflected on the mirror 5, and is focused by the objective lens 1 onto the cover glass 6. The focused light beam passes through the cover glass 6 and is collimated by the collimating lens 20 to be a parallel beam X.

In particular, the cover glass 6 is set in place of the recording medium, such as an optical disk or the like, to emulate a transparent layer of an optical disk. That is, since the optical disk has a transparent layer covering a surface where the focused beam reflects, and in operation the focused beam passes through the transparent layer before reflecting on the data layer and passing back through the transparent layer, the cover glass 6 is arranged to simulate the transparent layer of the optical disk.

The parallel beam x is divided by the beam splitter 21 into divided parallel beams X1 and X2. The divided parallel beams X1 and X2 reflect on the corner-cube reflector 22A back to the beam splitter 21. The divided parallel beam X1 reflected by the corner-cube reflector 22A passes through the beam splitter 21 and is directed to the lens 23. The divided parallel beam X2 passed through the beam splitter 21 is reflected by the corner-cube reflector 22B, and then reflected by the beam splitter 21 towards the lens 23. The divided parallel beams X1 and X2 are converged by the converging lens 23 so that the interference fringes K are formed on the CCD 24. The CCD 24 outputs an image signal representing the formed image of the interference fringes K to the data processing device 13, and an image of the interference fringes K is displayed on the screen G of the display 14.

In this case, positions of the collimating lens 20, the beam splitter 21, and the corner-cube reflectors 22A and 22B are adjusted in relation to the cover glass 6. Accordingly, if the optical axis of the objective lens 1 is perpendicular to the cover glass 6, the interference fringes K are not distorted.

In step S2, the data processing device 13 calculates the inclination angle θ and inclination direction. Specifically, the data processing device 13 compares the signal output from the interferometer unit 11 (the CCD 24) with a reference signal pre-stored in a memory (not shown) of the data processing device 13, and calculates the inclination direction and the inclination angle θ based on the comparison result. The calculated inclination direction and the inclination angle θ are stored in the memory of the data processing device 13, and will be used for generating a vector data representing the inclination direction and the inclination angle θ of the objective lens 1.

In step S3, the data processing device 13 then compares the inclination angle θ with the predetermined threshold value (e.g., 3 minutes) to determine whether the inclination angle θ is within a permissible angle range at step S3. If the inclination angle θ is out of the permissible range (NO at step S3), the inclination of the objective lens 2 is adjusted in the following steps S4–S8.

The optical head 15 is moved to the position at which the optical head 15 faces the inclination adjusting unit 12 at step S4, as shown in FIG. 3. The laser beam emitted by the laser diode 4 is still incident on the mirror 5 since the laser diode 4 is not turned OFF. However, as described above, the polarizing direction of the laser beam emitted by the laser diode 4 is perpendicular to the polarizing direction of the polarizing plate 34, and the beam reflected by the mirror, passes through the objective lens, beam splitter 31 and the converging lens 32 does not pass through the polarizing plate 34.

Figure 4B:
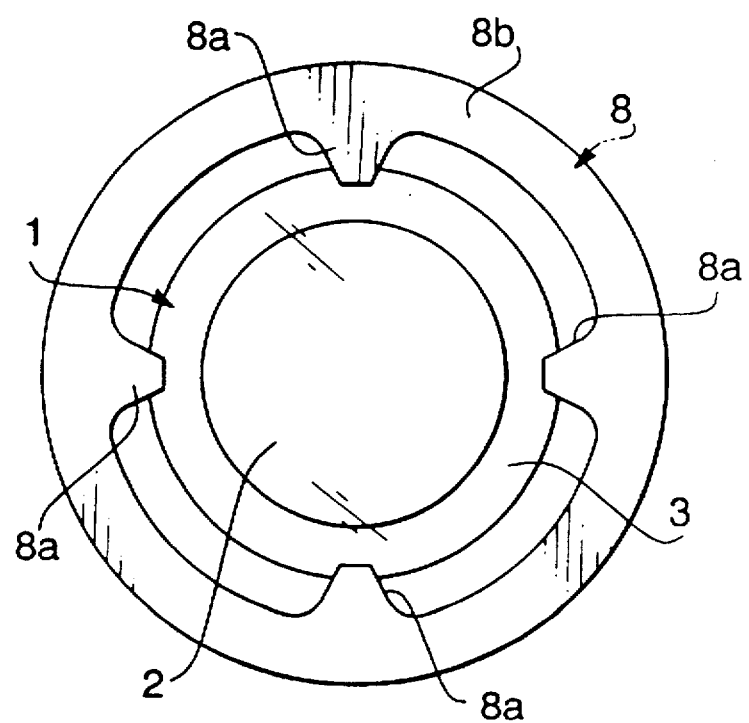
FIG. 4b is a top view of the lens and the jig.

When the inclination is to be changed, as shown in FIGS. 4a and 4b, a jig 8 is placed on the objective lens 1. The jig 8 includes picks 8a and a mirror surface 8b. The picks 8a abut the flat portion 3 of the objective lens 1 and the inclination of the objective lens 1 is adjusted by known operation of the jig 8. An exemplary mechanism for adjusting the inclination of the objective lens 1 is disclosed in U.S. Pat. No. 5,553,052, teachings of which are incorporated herein by reference.

FIG. 3 shows a condition in which the optical head 15 is positioned to face the inclination adjusting unit 12. It should be noted that when the inclination of the objective lens 1 is adjusted, the inclination status of the objective lens 1 is monitored simultaneously as the inclination is changed. For this purpose, the inclination adjusting unit 12 is provided with an inclination status monitoring system, which includes the light source 30, the beam splitter 31, the converging lens 32, the CCD 33, the data processing device 13 and the display 14.

At step S5, the light source 30 is driven to emit a light beam P1 which has a slightly larger diameter, in cross section, than a diameter of the objective lens 1. The light beam P1 reflects on the beam splitter 31 toward the objective lens 1. The flat portion 3 of the objective lens 1 and the mirror surface 8b of the jig 8 reflect a part of the beam P1. A reflected beam P2 (i.e., the beam reflected by the flat portion 3 of the objective lens 1 and the mirror surface 8b of the jig 8) passes through the beam splitter 31, and is focused by the converging lens 32 on the CCD which outputs an image signal to the data processing device 13. Thus, an image of the reflected beam P2 focused on the CCD 33 is displayed on the screen G of the display 14.

Figure 5A:
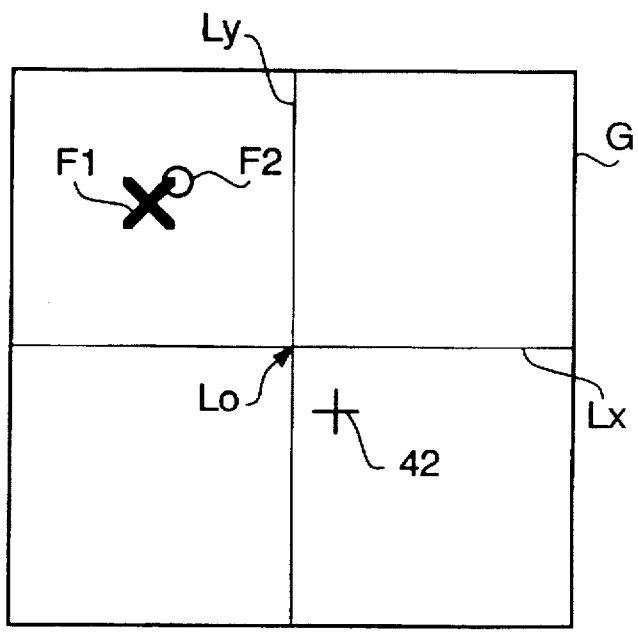
FIG. 5a shows a screen image of a reflected beam.

FIG. 5a shows the image displayed on the screen G of the monitor 14, corresponding to the reflected beam P2.

A first figure F1 represents an image corresponding to the flat portion 3 of the objective lens 1; and a second figure F2 represents an image corresponding to the mirror surface 8a. A center of the first figure F1 corresponds to the optical axis of the objective lens 1. The second figure F2 is to be ignored since the second figure F2 does not correspond to the optical axis of the objective lens 1.

As described above, the diameter of the beam P1 is relatively great with respect to the diameter of the objective lens 1 so that a beam reflected by the entire area of the flat portion 3 of the objective lens 1 is incident to the lens 32.

It is known that the radius of the beam waist ωo is expressed as follows:

$$\omega 0 = \lambda f / \pi \omega$$

where, $\lambda$ is a wavelength of the beam, f is the focal length of the lens (in this case, the lens 32), and ω is the radius of the beam incident to the lens. As understood from the formula above, as the radius ω of the incident beam increases, the diameter of the beam waist ω0 decreases. It is further known that, if the central area, in cross section, of the incident beam is obscured, the beam waist becomes smaller.

In the present embodiment, since the beam P1 is projected to the entire surface of the flat portion 3 of the objective lens 1, the beam reflected on the flat portion 3 and incident to the lens 32 has a relatively large diameter. Further, since the beam incident to the lens 32 is the beam reflected by the flat portion 3 of the objective lens 1, the central portion thereof is obscured. In such a case, i.e., the cross section of the beam has an annular shape, the beam converged by the lens 32 has a smaller size than in a case where the beam has a circular cross section. This effect is known as a superresolution effect. Accordingly, the size of the spot formed on the CCD 33, i.e., the figure F1 is relatively small. For a similar reason, the size of the figure F2 is also small. It should be noted that the beam projected and reflected on the lens portion 2 diverges due to the concave shape of the lens portion 2 and does not substantially affect the image formed on the CCD 33 Further, since the beam reflected on the flat portion 3 at the portions between the picks 8a and directed to the edges of the portions of the jig 8 diverges in directions parallel to diameters connecting the opposite portions between the picks 8a, the figure F1 is formed as an X-shape.

Further to the above, the first figure F1 as shown in FIG. 5a still extends across about 10 minutes of arc. However, since a part of the parallel beam P1 is shaded by the pick 8a and diffracted, a center region of the first figure F1 is brighter within a range of about 2 minutes of the arc. Accordingly, it is relatively easy to identify the center of the first figure F1.

Lines Lx and Ly displayed on the screen G represent axes of the inclination adjusting unit 12, with L0 being an origin of the Lx-Ly coordinates. In this embodiment, the cursor pointer 42 is shown as a small cross.

Figure 5B:
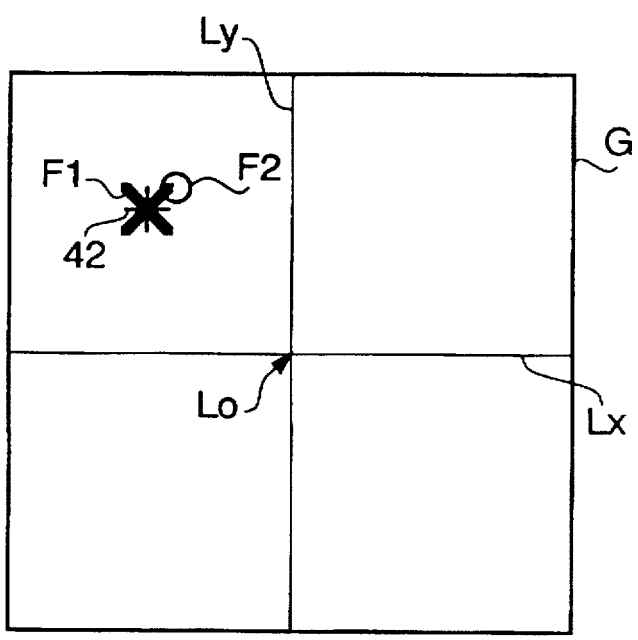
FIG. 5b shows a screen image when the current inclination of the lens is input.

At step S6, the operator is required to locate the cursor pointer 42 on the center of the first figure F1, and click a mouse button (not shown) to input the position of the first figure F1 on the screen G (see FIG. 5b). Since the center of the first figure F1 represents the optical axis of the objective lens 1, the data processing device 3 calculates a target position based on the position of the first figure F1 on the screen G and the data representing the inclination direction and inclination angle which were obtained at S2 with use of the interferometer unit 11. Preferably the cursor pointer 42 is moved with use of the mouse 40, and the position is input by clicking the mouse button (not shown). Alternatively, the keyboard 41 or some other input device may also be used, if available.

Figure 5C:
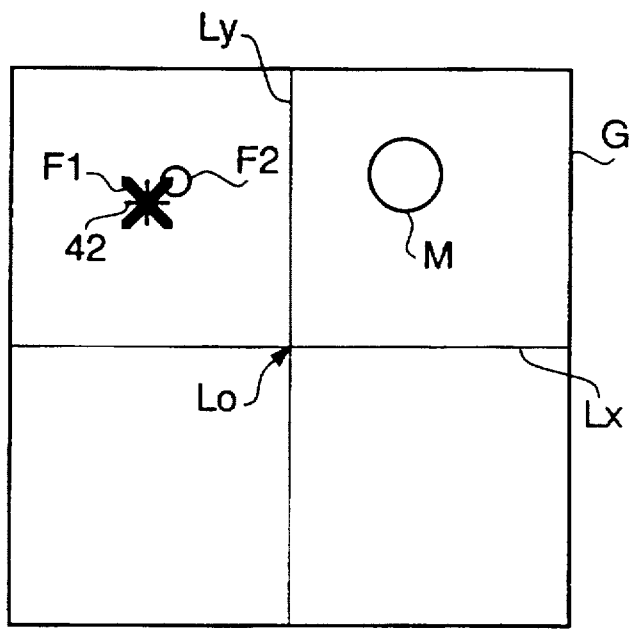
FIG. 5c shows a screen image of a target region which is referred to for adjusting the inclination of the lens.
Figure 5D:
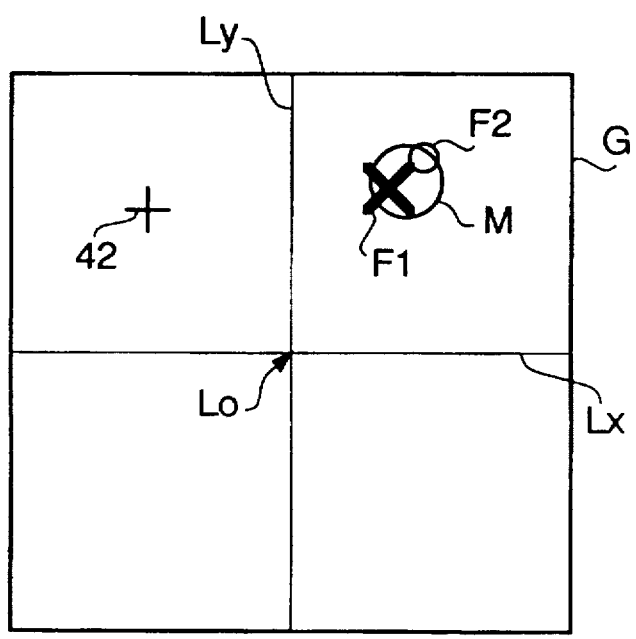
FIG. 5d shows a screen image when the lens position has been adjusted.

In Step S7, the data processing device 13 calculates the position of the target region M based on the inclination direction, and inclination angle θ. Specifically, the data processing device 13 calculates the position of the target region M on the screen G, based on the vector data stored in the memory at step S2, and the position of the center of the first figure F1 input in S6, and displays the target region M on the screen G as shown in FIG. 5c. As described briefly above, the target region M corresponds to the permissible range of the inclination angle θ, that is, the area in which the inclination angle θ is less than the predetermined threshold value (e.g., 3 minutes). Thus, if the center of the first figure F1 is moved into the target region M by changing the inclination of the objective lens 1, the inclination angle θ will be such that the data recording/reproducing device 10 can correctly record and/or reproduce data.

In step S8, the operator manipulates the inclination adjusting unit 12 to adjust the inclination of the optical axis such that the first figure F1 is moved into the target region M on the screen G of the display 14. Note that the jig 8 may slip on the objective lens 1, and the objective lens 1 may not move even if the jig 8 is moved to change the inclination of the objective lens 1. In order for the operator to ensure that the jig 8 and the objective lens 1 are both moved, it is preferable to monitor the movement of the jig 8. In the embodiment, the second figure F2 represents the inclination of the jig 8, and accordingly, the operator can adjust the inclination of the objective lens 1 while monitoring the inclining status of both the objective lens 1 and the jig 8.

After step S8, the light source 30 may be turned OFF, the jig 8 detached from the objective lens 1, and the optical head 15 located at the position where it faces the interferometer unit 11 again (S1). If the beam emitted by the light source 30 does not affect the detection of the interference fringes K, the light source 30 may be kept turned ON so as to be ready for subsequent inclination adjustment operations.

Thereafter, similar to the above, the interference fringes K are captured again in step S2, and it is determined whether the inclination angle θ is out of the predetermined permissible range by comparing the data of the captured interference fringes with the pre-stored data (S3).

If the inclination angle θ is within the permissive range (i.e., within 3 minutes) (YES at S3), the adjustment of the optical axis is finished. Then, the optical head 15, especially, the portion where the objective lens 1 is supported on the sloping portion 7a, is illuminated by the UV light. Thus, the UV hardening adhesive is hardened, and accordingly, the objective lens 1 is fixed in the lens holder 7.

As described above, the optical head 15 can be positioned either at the interferometer unit 11 or at the inclination adjusting unit 12 by simply moving the optical head 15 along the rail members 9. Further, it is not necessary to turn off the laser diode 4, used for the detection of interference fringes, when the optical head 15 is located at the adjusting unit 12. When the inclination of the objective lens 1 is changed, the status of the objective lens 1 can be monitored precisely, even if the light source for detection of the interference fringes stays turned ON, and inclination can be adjusted easily and accurately.

Although the structure and operation of a lens adjusting system is described herein with respect to the preferred embodiment, many modifications and changes can be made without departing from the spirit and scope of the invention.

The present disclosure relates to subject matter contained in Japanese Patent Application No. HEI 08-197315, filed on Jul. 26, 1996, which is expressly incorporated herein by reference in its entirety.

What is claimed is:

1. A lens inclination adjusting system for adjusting an inclination of a lens mounted on an optical head of a data recording/reproducing device, comprising:

an interferometer which generates an image of interference fringes representative of an inclination of said lens with respect to a reference surface;

a first light source which emits a first light beam towards said interferometer, said optical head being located at a first position at which an optical axis of said lens coincides with an optical axis of said interferometer when said image of the interference fringes is formed with said interferometer, said lens being located between said first light source and said interferometer, said optical head being movable along an optical axis of said first light beam; and an inclination adjusting unit including an inclination monitoring system and inclination changing system, said optical head being located at a second position where said optical head faces said inclination changing system when the inclination of said lens is adjusted, said inclination monitoring system including:

a second light source which emits a second light beam;

an optical system which directs said second light beam towards said lens;

an image receiving system having an image receiving surface, said second beam being reflected by said lens to be incident on said image receiving surface; and an optical element which prevents said first beam from being incident on said image receiving surface when said optical head is located at said second position, said optical element allowing at least a part of said second beam reflected by said lens to pass therethrough.

2. The inclination adjusting system according to claim 1, wherein said first beam is a linearly polarized beam polarized in a first direction, wherein said second beam includes a component which is not polarized in said first direction, and wherein said optical element is a polarizing plate whose polarizing direction is rotated 90 degrees with respect to said first direction.

3. The inclination adjusting system according to claim 2, wherein said optical system includes a filter which reduces an intensity of said second beam emitted by said second light source.

4. The inclination adjusting system according to claim 1, wherein said first light source comprises a Helium-Neon laser source.

5. The inclination adjusting system according to claim 1, wherein said second light source comprises a laser diode.

6. The inclination adjusting system according to claim 1, further comprises a guiding member for slidably guiding said optical head in said direction of said first beam at least between said first and second positions.

7. The inclination adjusting system according to claim 6, wherein said guiding member is provided inside said data recording/reproducing device.

8. The inclination adjusting system according to claim 1, wherein said lens has a lens portion, and a flange portion and surrounding said lens portion, said second beam reflected by said flange portion is directed to said image receiving surface.

9. The inclination adjusting system according to claim 8, wherein said monitoring system further comprises a converging lens between said lens and said image receiving surface, wherein said second beam is incident on substantially an entire area of said flange portion and said second beam reflected on said entire area of said flange portion is converged by said converging lens.

10. A lens inclination monitoring system for monitoring an inclination of a lens mounted on an optical head of a data recording/reproducing device, said optical head being movable in a predetermined direction, the lens inclination monitoring system comprising:

a first light source which emits a first light beam towards one side of said lens, said first light having a predetermined characteristic;

a second light source which emits a second light beam towards another side of said lens;

a light receiving system arranged on the other side of said lens, said light receiving system receiving light incident from said lens; and an optical element arranged between said lens and said light receiving system, said optical element preventing a light beam having said predetermined characteristic from passing therethrough.

11. The lens inclination monitoring system according to claim 10, wherein said second light beam has a component beam which has at least a characteristic different from said predetermined characteristic.

12. The lens inclination monitoring system according to claim 11, wherein said predetermined characteristic includes a predetermined polarization direction, and wherein said optical element is a polarization filter which allows a beam having a polarization direction perpendicular to said predetermined polarization direction to pass therethrough.

13. The lens inclination monitoring system according to claim 12, further comprising a displaying system which displays the image of the received light received by said light receiving system.

* * * * *